United States Patent
Manzoor

(10) Patent No.: US 10,612,620 B2
(45) Date of Patent: Apr. 7, 2020

(54) LOW FREQUENCY TORSIONAL SPRING-DAMPER

(71) Applicant: Suhale Manzoor, Plymouth, MI (US)

(72) Inventor: Suhale Manzoor, Plymouth, MI (US)

(73) Assignee: OPTIMIZED SOLUTIONS, LLC, Plymouth, MI (US)

( * ) Notice: Subject to any disclaimer, the term of this patent is extended or adjusted under 35 U.S.C. 154(b) by 0 days.

(21) Appl. No.: 16/377,312

(22) Filed: Apr. 8, 2019

(65) Prior Publication Data

US 2019/0309821 A1    Oct. 10, 2019

Related U.S. Application Data

(60) Provisional application No. 62/655,390, filed on Apr. 10, 2018.

(51) Int. Cl.
| | |
|---|---|
| *F16F 15/12* | (2006.01) |
| *F16F 15/121* | (2006.01) |
| *F16H 55/36* | (2006.01) |

(52) U.S. Cl.
CPC ......... *F16F 15/1212* (2013.01); *F16H 55/36* (2013.01); *F16H 2055/366* (2013.01)

(58) Field of Classification Search
CPC ...... F16F 15/12; F16F 15/1212; F16F 15/126; F16F 15/1442; F16F 15/30; B60K 25/02; F16H 55/36; F16H 2055/366
See application file for complete search history.

(56) References Cited

U.S. PATENT DOCUMENTS

| | | | |
|---|---|---|---|
| 9,958,043 B2* | 5/2018 | Nakamura | F16D 3/78 |
| 2012/0277006 A1* | 11/2012 | Kim | F16D 9/00 464/37 |
| 2016/0252143 A1* | 9/2016 | Kato | F16D 43/215 192/46 |
| 2017/0059028 A1* | 3/2017 | Manzoor | F16F 15/126 |

FOREIGN PATENT DOCUMENTS

| | | | | |
|---|---|---|---|---|
| EP | 1413751 A1 * | 4/2004 | | F04B 27/0895 |
| EP | 2060814 A1 * | 5/2009 | | F16D 9/00 |
| JP | 2004197928 A * | 7/2004 | | |
| JP | 2008095838 A * | 4/2008 | | |
| WO | WO-2008044590 A1 * | 4/2008 | | F16D 9/00 |

* cited by examiner

*Primary Examiner* — Adam D Rogers

(57) ABSTRACT

The disclosed invention is a novel method for constructing a Low Stiffness Torsional Spring-Damper that simultaneously yields the following advantages over conventional designs: (1) the elastomer is not mold-bonded to the two metallic extremities; (2) the amount of elastomer is relatively smaller compared to conventionally constructed devices; (3) the device only allows the torsional direction to be spring loaded; (4) there is some damping inherently present in the system; (5) the device does not disintegrate on failure of the elastomeric element; and (6) the device is serviceable in the field without disengaging from the rotating shaft. Such a Low Stiffness Torsional Spring-Damper when used in a Torsional Vibration Isolator or a Torsional Vibration Damper would reduce its cost while improving its structural and modal integrity and enabling its serviceability in the field.

5 Claims, 4 Drawing Sheets

LOW FREQUENCY TORSIONAL SPRING-DAMPER

FIELD OF INVENTION

The present invention generally relates to a torsional spring-damper. More particularly the invention discloses a novel method for constructing a cost-effective, structurally and modally stable low stiffness torsional spring-damper that is usable both in vibration isolation and vibration absorption and is serviceable in the field without disassembly from the vibrating shaft.

BACKGROUND

Torsional springs find use in a variety of mechanical applications. When such springs are used for improving Noise Vibration and Harshness characteristics of mechanical devices, some form of material base damping is generally desired. Elastomer springs are therefore preferred over metallic springs for constructing such devices because of their relatively low cost and weight, and the relatively higher coefficient of viscous damping present therein.

There are two categories of torsional vibration seen in most mechanical applications utilizing rotating shafts. The first is recognized as rigid-body vibration where every point in the entire shaft oscillates angularly with the same amplitude. Such rigid-body vibration is characterized by low frequency and large amplitude and is isolated from permeating the rest of the system by the introduction of a Low Stiffness Torsional Spring-Damper. This is known as torsional vibration isolation and the corresponding device is known as a Torsional Vibration Isolator. The prime objective of a Torsional. Vibration Isolator is to prevent vibration due to the rigid-body motion of the shaft to be transmitted to the rest of the machine.

The second torsional vibration category is recognized as a flexible-body vibration where every point in the entire shaft oscillates angularly with varying amplitudes thereby resulting in the flexing of the shaft. Such flexible-body vibration is characterized by higher frequency and small amplitude and is attenuated from the vibrating shaft by absorbing it with a torsional spring-inertial system. This is known as torsional vibration absorption and the corresponding device is known as a Torsional Vibration Absorber. The prime objective of the Torsional Vibration Absorber is to lower the amplitude of vibration at the shaft to acceptable limits thereby preventing its premature failure in fatigue.

The most common application for a Torsional Vibration Absorber is the crankshaft torsional vibration damper where the frequencies are high (usually between 150 Hz. to 350 Hz.) and the conventional construction methods work adequately. However, there are several other applications where Torsional Vibration Absorbers are commonly employed in mechanisms and required to attenuate low frequency vibrations. Examples of such applications are replete in vehicle drive-shafts, prop-shafts, and half-shafts. This is where a Low Stiffness Torsional Spring-Damper is generally introduced along with a tuned inertia ring.

When a Low Stiffness Torsional Spring-Damper is desired for either a Torsional Vibration Absorber or a Torsional Vibration Isolator application, an immediately apparent problem is that the Low Stiffness Torsional Spring-Damper is structurally and modally unstable in the non-torsional directions (e.g. in the axial, conical, or radial directions relative to the central axis of the rotating shaft).

Structural instability refers to the Low Stiffness Torsional Spring-Damper potentially buckling or failing in any non-torsional direction under externally applied loads (e.g. belt-load in a crankshaft isolator causing conical buckling of a Torsional. Vibration Isolator. Modal instability refers to the Low Stiffness Torsional Spring-Damper potentially buckling or failing in any non-torsional direction under internal loads (e.g. axial dynamic loads in a drive-shaft caused by the increased motion of the inertia ring during operation. This causes the Torsional. Vibration Absorber to move axially and dislocate from its installed position. Such Low Stiffness Torsional Spring-Dampers are constructed with large volumes of elastomer, and with elastomer to metal bonding to prevent a failure due to the aforementioned instabilities. These constructions make the Low Stiffness Torsional Spring-Damper an expensive mechanical component.

FIG. 1 illustrates a conventional Torsional Vibration Isolator widely employed in automotive applications—particularly in vehicle crank-shafts. The Torsional Vibrational Isolator most often comprises of a metallic hub 10 that is mounted on its cylindrical Inner Diametric surface most proximate the Axial Center-Line of the Torsional Vibration Isolator to the vibrating shaft via a press-fit. A metallic pulley 50 is held concentric to hub 10 by the Low Stillness Torsional Spring-Damper and a tubular bushing 60. The Low Stiffness Torsional Spring-Damper includes a tubular inner metallic sleeve 20 that is press fitted onto hub 10, a tubular outer metallic sleeve 40 that is press fitted into pulley 50, and elastomer 30 that is injection molded and bonded (mold-bonded) between sleeves 20 and 40. Tubular bushing 60 is press fitted onto the pulley 50 on its non-slippery Inner Diametric Surface ID and slip fitted onto the hub 10 on its slippery cylindrical Outer Diametric surface. This essentially allows pulley 50 to interface with hub 10 through the Low Stiffness Torsional Spring-Damper.

It must be appreciated here that mold-bonding of elastomer 30 to sleeves 20 and 40 is an expensive manufacturing operation. This process involves sandblasting sleeves 20 and 40, properly masking the unbonded surfaces, spraying the bonded surfaces with a primer followed by an adhesive, and finally loading sleeves 20 and 40 into an injection (or transfer) molding machine where elastomer 30 is fed into the allocated space. In addition, careful monitoring of the mold parameters (such as time and temperature) is imperative to ensure a proper bonding of the adhesive simultaneously with proper cure of the elastomer 30.

Furthermore, to relive post-mold tension (due to substantially different coefficients of thermal expansion of elastomer 30 verses sleeves 20 and 40) in elastomer 30, sleeves 20 and 40 must be press-fitted into hub 10 and pulley 50 respectively, thereby requiring tight dimensional tolerances and a complex assembly process. Furthermore, a large volume of elastomer 30 is necessitated to provide the adequate fatigue life and the requisite low stiffness required for vibration isolation. These factors make the Torsional Vibration Isolator an expensive product to manufacture.

FIG. 2 illustrates a conventional low frequency Torsional Vibration Absorber that is widely employed in automotive driveline applications—particularly in vehicle drive-shafts, prop-shafts and half-shafts. The Torsional Vibration Absorber most often comprises of a metallic hub 10a that is mounted on its Inner Diametric Surface most proximate the Axial Center Line of the Torsional Vibration Absorber the vibrating shaft via a press fit. A metallic ring 50a with a measured amount of Polar Mass Moment of Inertia is held concentric to hub 10a by the Low Stiffness Torsional Spring-Damper. The Low Stiffness Torsional Spring-Damper includes a tubular inner metallic sleeve 20a that is press fitted onto hub 10a, and elastomer 30a that is mold-bonded between sleeve 20a and ring 50a. This essentially allows ring 50a to interface with hub 10a through the Low Stiffness Torsional Spring-Damper.

As in the case of a conventional Torsional Vibration Isolator, it must be appreciated in the case of a conventional Torsional Vibration Absorber mold-bonding elastomer 30a to sleeve 20a and ring 50a is an expensive manufacturing operation (for the same reasons stated above). Furthermore, to relive post-mold tension (due to substantially different coefficients of thermal expansion of elastomer 30a verses sleeve 20a and ring 50a) in elastomer 30a, sleeve 20a must be press-fitted into hub 10a, thereby requiring tight dimensional tolerances and a complex assembly process. Furthermore, a large volume of elastomer 30a is necessitated to provide the adequate fatigue life and the requisite low frequency required for vibration absorption. These factors make the low frequency Torsional Vibration Absorber an expensive product to manufacture.

An additional concern in a low frequency Torsional Vibration Absorber is the structural and modal instability inherent in the device. Structural instability is due to the geometry of elastomer 30a (with through windows included for low stiffness) in addition to the type of elastomer compound utilized for such construction. Generally, elastomers with low carbon black particle loading are used for low frequency Torsional Vibration Absorber applications that give cause for potential fatigue failure (lowering carbon black particle loading lowers the dynamic shear modulus of the elastomer, but also weakens it being the binding substrate for the elastomer).

Modal instability originates due to the relatively low stiffness of elastomer 30a coupled with the mass and Polar Mass Moment of Inertia inherent to ring 50a, consequently allowing low frequency non-torsional vibration modes. It is common for the first mode-shape of a low frequency Torsional Vibration Absorber to be non-torsional in character, and for the device to have inadequate decoupling between the vibratory mode-shapes. Both these characteristics fall below industrial design best practices and are undesirable.

Another interesting point concerning conventionally constructed Torsional Vibration Absorbers is the elastomer 30a is the weakest structural link, and a failure thereof is catastrophic. Meaning that the entire sub-assembly disintegrates if the elastomer element fails. This is a serious safety concern as ring 50a that has substantial Polar Mass Moment of Inertia can become air-borne and cause damage to life and property.

Finally, a commonly realized problem common to both Torsional Vibration Isolators and Torsional Vibration. Absorbers is that they are not serviceable in the field. In fact, if the elastomer 30 (in a Torsional Vibration Isolator or 30a (in a Torsional. Vibration Absorber fails, most often the entire device is discarded, and a brand-new part is used as a replacement. At the very least, the device must be dismounted from the rotating shaft (often requiring the disassembly of the shaft itself from the machine), reworked (e.g. a new Low Stiffness Torsional Spring-Damper replaces the failed Low Stiffness Torsional Spring-Damper, re-balanced, and re-mounted back on the rotating shaft.

A novel design for a Low Stiffness Torsional Spring-Damper is therefore desired for Torsional Vibration Isolators and low frequency Torsional Vibration Absorbers, where despite having a low torsional spring stiffness, the Low Stiffness Torsional Spring-Damper has the following characteristics: (1) the elastomer is not mold-bonded to the two metallic extremities; (2) the amount of elastomer is relatively smaller compared to conventionally constructed devices; (3) the device only allows the torsional direction to be spring loaded; (4) there is some damping inherently present in the system; (5) the device does not disintegrate on failure of the elastomeric element; and (6) the device is serviceable in the field without disengaging from the rotating shaft.

SUMMARY OF INVENTION

The disclosed invention is a novel method for constructing a Low Stiffness Torsional Spring-Damper that simultaneously yields the following advantages over conventional designs: (1) the elastomer is not mold-bonded to the two metallic extremities; (2) the amount of elastomer is relatively smaller compared to conventionally constructed devices; (3) the device only allows the torsional direction to be spring loaded; (4) there is some damping inherently present in the system; (5) the device does not disintegrate on failure of the elastomeric element; and (6) the device is serviceable in the field without disengaging from the rotating shaft. Such a Low Stiffness Torsional Spring-Damper when used in a Torsional Vibration Isolator or a Torsional Vibration Absorber would reduce its cost while improving its structural and modal integrity and enabling its serviceability in the field.

The disclosed invention comprises of the following components: (1) a central hub constructed from a rigid material including but not limited to steel, cast-iron, aluminum, or a composite material; (2) a radially intermediately disposed commercially available or specialty tubular split-bushing constructed from a rigid material including but not limited to steel, bronze, or composite layered materials; (3) an external ring that is constructed from a rigid material including but not limited to steel, cast-iron, aluminum, or a composite material; (4) a plurality of commercially or specialty grooved headed-pegs that are rigidly connected to either axial periphery of the ring constructed from a rigid material including but not limited to steel, cast-iron, aluminum, or a composite material; and (5) a plurality of commercially available or specialty O-rings that are constructed from an elastomeric material including but not limited to Styrene Butadiene; Poly Butadiene, or Ethelene Propylene Diene Monomer.

This invention and the method of assembly thereof may be further appreciated considering the following detailed description and drawings in which:

DETAILED DESCRIPTION

Figure 1:
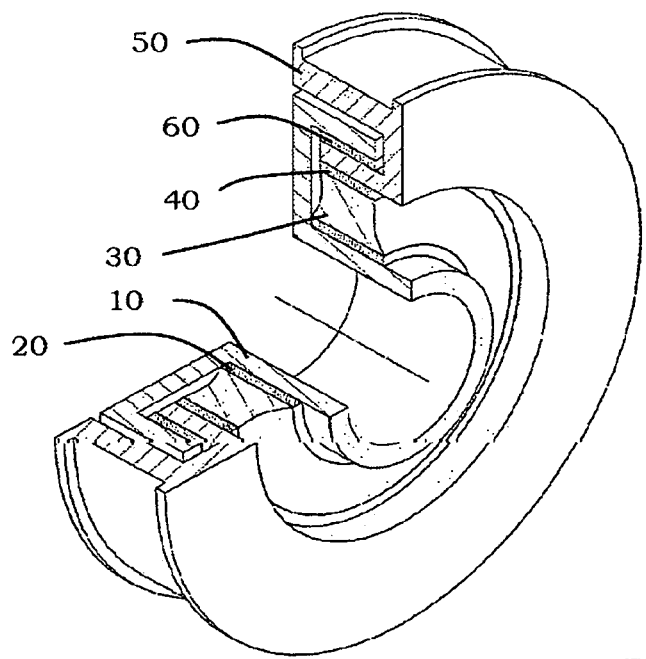
FIG. 1 is a partial cross-section illustrating the internal structure of a conventional Torsional Vibration Isolator.
Figure 2:
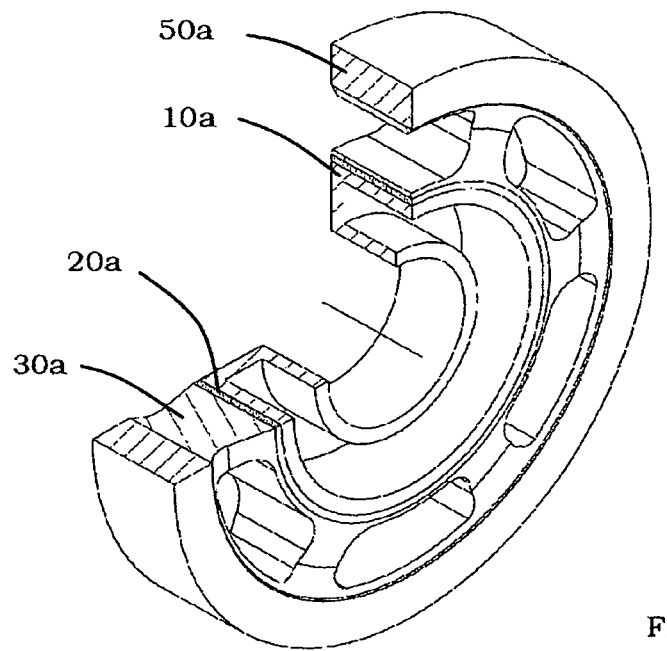
FIG. 2 is a partial cross-section illustrating the internal structure of a conventional Torsional Vibration Absorber.
Figure 3:
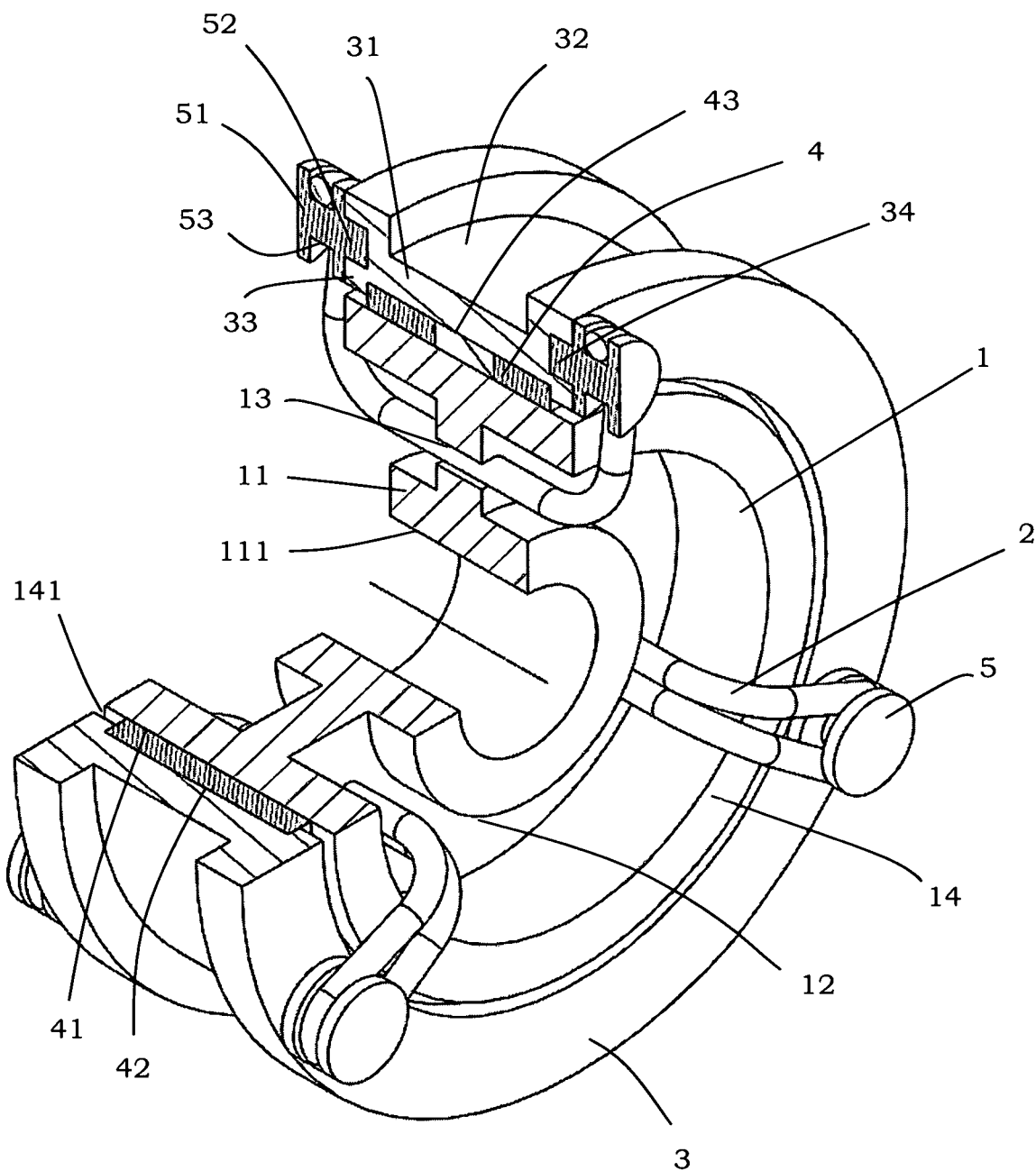
FIG. 3 is a partial cross-section illustrating the internal structure of an embodiment of the invention where a plurality of elastomeric O-rings is employed as the Low Stiffness Torsional Spring-Damper.

FIG. 3 illustrates an embodiment of the invention that comprises of hub (hub) 1, a tubular split-bushing (bush) 4, an axis-symmetric ring (ring) 3, a plurality of elastomeric O-rings (spring) 2, and a plurality of grooved headed-pegs (pegs) 5.

Hub 1 is radially most proximate to the Axial Center Line of the Low Stiffness Torsional Spring-Damper and includes a radially proximate tubular nose 11, and a radially distal tubular flange 14. Nose 11 and flange 14 are radially connected on their respective Outer Diametric Surface and Inner Diametric Surface by a central tubular rib 12. The Inner Diametric Surface 111, of nose 11 is rigidly mounted onto the rotating shaft most often via a press-fit condition. Rib 12 has a plurality of through axial openings 13 that allow the passage of the spring 2 axially through rib 12.

The Outer Diametric Surface 141 of flange 14, receives Inner Diametric Surface 41 of bush 4. Inner Diametric Surface 41 is the non-slippery surface of bush 4 and has a press-fit with Outer Diametric Surface 141. The bush is tubular with a split through is axial length at one point circumferentially (split) 43. Split 43 may be either parallel or angular to the Axial Center Line. Split 43 is to facilitate the loading of the bush 4 into the channel defined for accepting it on its Outer Diametric Surface 42 and its axial extremities. The channel present in ring 3 includes two opposing circumferential ledges at both axial extremities (ledges) 33 and Inner Diametric Surface 31. OD 42 is the slippery surface of bush 4 and has a slip-fit with Inner Diametric Surface 31 of channel in ring 3.

It must be appreciated that the geometric shape of hub 1 is flexible, the only three necessary features being Inner Diametric Surface 111 that interfaces with the rotating shaft, the Outer Diametric Surface 151 that interfaces with bush 4, and a plurality of through axial openings 13 in its central region.

Additionally, it must be appreciated that bush 4 can be replaced with any other type of bearing including but not limited to, roller ball bearing, needle bearing, roller thrust bearing etc. If a bearing is used instead of bush 4 then a channel need not be formed in ring 3 by Inner Diametric Surface 31 and ledges 33. The bearing can now have a press fit on ID 31 of ring 3, and Outer Diametric Surface 141 of hub 1. Also, a plurality of bushings and/or bearings may be used for accomplishing the same objective as bush 4.

The radially most distal axisymmetric surface 32 ring 3 may be cylindrical, include a single or set of circumferential belt grooves, include a set of axially or radially oriented gear or sprocket teeth, or be of any other intended shape to interact with external machinery. Ring 3 on both its axial peripheries includes a plurality of axially oriented blind holes 34. Each hole 34 receives the narrow cylindrical end 52 of a peg 5. Axially opposing the narrow cylindrical end 52, each peg 5 has a head 51 with a diameter larger than that of the narrow cylindrical end 52 including a circumferential groove 53.

Spring 2 includes a plurality of elastomer O-rings that are threaded through the openings 13 present in hub 1 in twin fold, stretched and looped around grooves 53 on each peg 5 on either axial periphery of ring 3. The geometry of the openings 13 is such that they allow spring 2 to axially pass through hub 1.

The inventor recognizes that the plurality of pegs 5 and ring 3 can be unified into a single component. For example, ring 3 could be a metallic stamping where pegs 5 are formed by bending tabs into the desired shape. Peg 5 geometry can vary infinitely to any shape that allows spring 2 to be looped around and be retained during operation. Similarly., the inventor recognizes that the geometry of groove 53 in peg 5 can have several possible configurations including but not limited to angled grooves, semi-circumferential grooves, grooves with non-circular cross-sections, or even no grooves. Also pegs 5 need not have their axes parallel to the Axial Center Line.

The inventor also recognizes that spring 2 need not be limited to a plurality of elastomer O-rings but can include several other constructions such as elastomer cables with twin loops, or elastomer rings of various cross-sectional shapes including but not limited to square, rectangular, triangular, or elliptical cross-sectional shapes. Furthermore, it is possible to have several looping configurations that would yield different stiffness and damping for spring 2. For example, a single O-ring 2 looping across more than one pegs 5 located on ring 3, or even a composite looping combination (e.g. where a few O-rings loop across more than one pegs 5 located on ring 3 while remaining O-rings loop across only one peg 5 located on ring 3).

Although there are several possible methods of assembling the Low Stiffness Torsional Spring-Damper, a suggested method is to: (1) mount the pegs 5 onto ring 3; (2) radially squeeze and install bush 4 into the channel in Ring 3; (3) mount hub 1 into the subassembly thus obtained via a press-fit; (4) mount spring 2 onto the sub-assembly thus obtained by looping the O-rings around grooves 53 in pegs 5 and threading them twin fold through the axial openings 13 in hub 1.

The advantages of the disclosed invention over conventional constructions are hereby elaborated: First, the need for mold-bonding has been eliminated completely (thereby enhancing cost-effectiveness and ease of manufacturing). Second, the volume of elastomer used is considerably smaller than that used in conventional designs; for example, in one arrangement the volumetric reduction was approximately 80% (thereby enhancing cost-effectiveness). Third, due to the presence of the bush, the invention allows only the torsional degree of freedom to be active (thereby enhancing modal stability). Fourth, due to the use of elastomeric springs, the device has viscous damping inherent to the material (thereby enhancing its Noise Vibration and Harshness performance). Fifth, due to the novel design, a failure of the elastomer does not disintegrate the entire device; the metallic bush joint is mechanically more robust (thereby enhancing its safety characteristics). Lastly, the part can easily be serviced without disassembly from the rotating shaft by pulling out the failed O-rings and replacing them with new O-rings.

Figure 4:
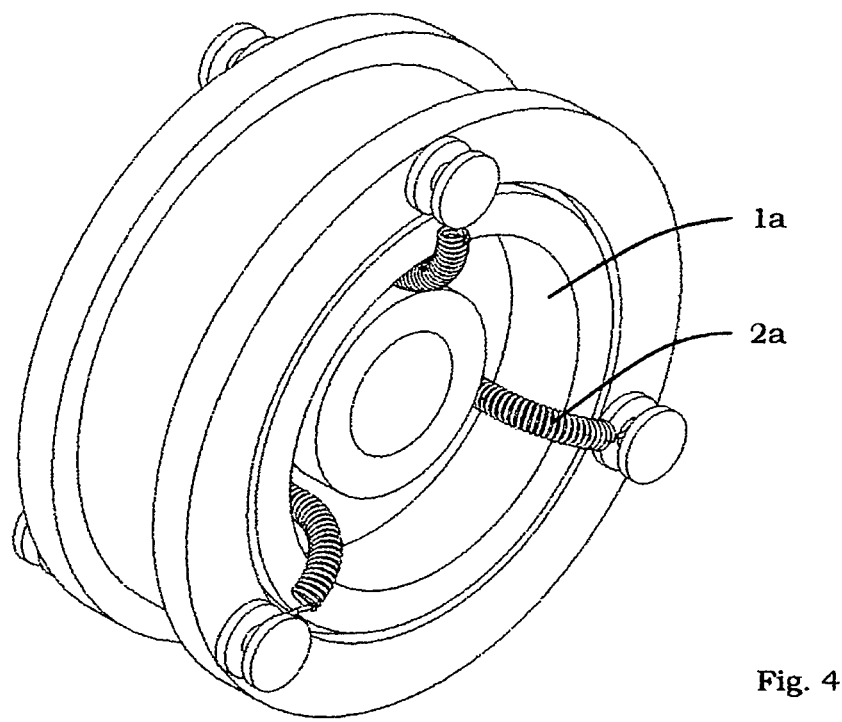
FIG. 4 is an illustration of an embodiment of the invention where a plurality of metallic extension springs is employed as the Low Stiffness Torsional Spring-Damper.

FIG. 4 illustrates an embodiment of the invention that comprises of identical components and construction as the embodiment illustrated in FIG. 3 except where the elastomer O-ring based spring 2 is here replaced by metallic extension springs 2a with double end hooks that pass through the hub 1a. In this embodiment, the viscous damping is replaced by coulomb damping provided by the friction in springs 2a during operation.

Figure 5:
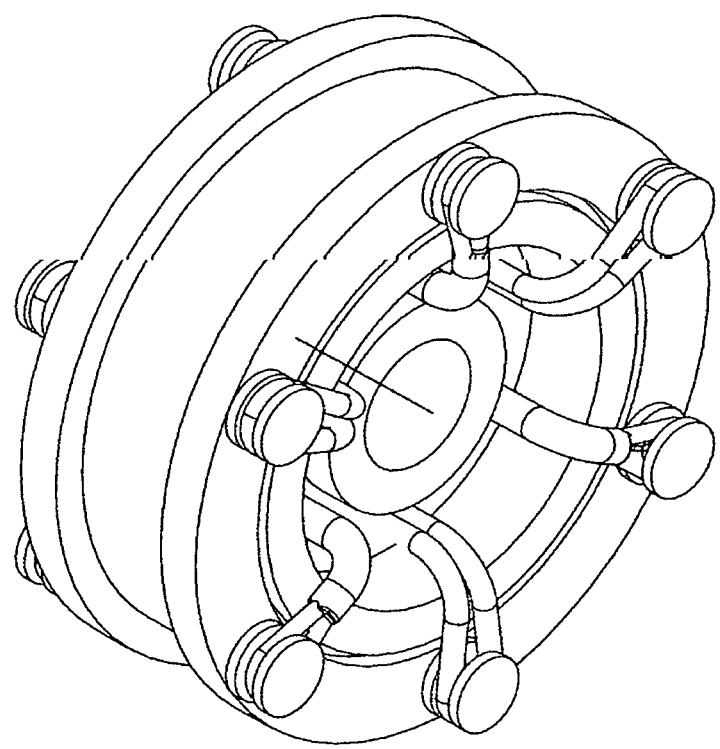
FIG. 5 is an illustration of an embodiment of the invention where a plurality of elastomeric cables and elastomeric O-rings are employed as the Low Stiffness Torsional Spring-Damper.

FIG. 5 is an illustration of an embodiment of the invention where a plurality of elastomeric cables and elastomeric O-rings are employed as the Low Stiffness Torsional Spring-Damper.

Figure 6:
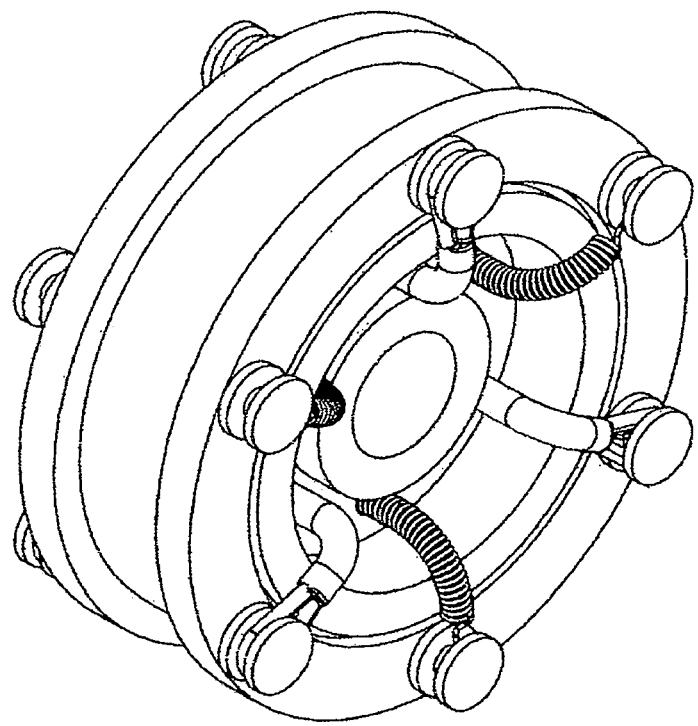
FIG. 6 is an illustration of an embodiment of the invention where a plurality of elastomeric cables and metallic extension springs are employed as the Low Stiffness Torsional Spring-Damper.

FIG. 6 is an illustration of an embodiment of the invention where a plurality of elastomeric cables and metallic extension springs are employed as the Low Stiffness Torsional Spring-Damper.

Figure 7:
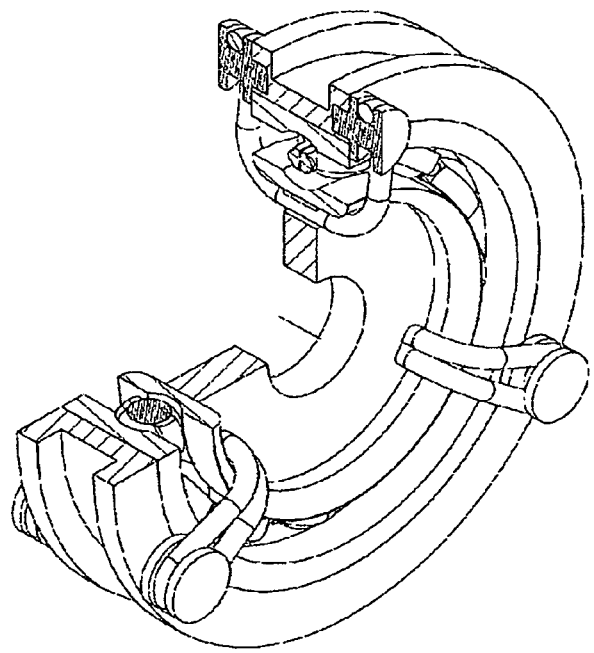
FIG. 7 is an illustration of an embodiment of the invention where a ball-bearing is used instead of a bushing.

FIG. 7 is an illustration of an embodiment of the invention where a ball-bearing is used instead of a bushing.

The invention claimed is:

1. A torsional spring-damper system comprising:
   a first member adapted to attach to a rotating component and having a radially outer surface and a plurality of axial windows;
   a second member having a radially inner surface wherein the radially outer surface and the radially inner surface are separated by a radial gap, further comprising of a first side surface that axially bounds the radially inner surface and includes a first plurality of axial protrusions and a second side surface that axially bounds the radially inner surface and includes a second plurality of axial protrusions;
   a bearing is press-fitted in the radial gap to ensure that only rotational motion is possible between the first member and the second member;
   a plurality of spring members that pass through the plurality of axial windows and mount on one or more of the first plurality of axial protrusions and on one or more of the second plurality of axial protrusions.

2. The torsional spring-damper of claim 1 wherein one or more spring member of the plurality of spring members is an elastomer O-ring that passes twin-fold through the plurality of axial windows and mounts on two opposing protrusions of the first and second plurality of axial protrusions.

3. The torsional spring-damper of claim 1 wherein one or more spring member of the plurality of spring members is an elastomer cable having a loop on each end.

4. The torsional spring-damper of claim 1 wherein one or more spring member of the plurality of spring members is a metallic extension spring is a metallic extension spring having a hook on each end.

5. A torsional spring-damper of claim 1 where the second member and the first and second plurality of axial protrusions are not monolithic, but separate components initially assembled through a joining process that is one of press-fitting, bolting, welding, or gluing.

* * * * *